C. Alden,
Grain Ventilator.
No. 83,753. Patented Nov. 3, 1868.

Witnesses
E. F. Kastenhuber
Chas. Wohlers

Inventor
Chas. Alden
jr
Van Santvoord & Hauff
Attys

CHARLES ALDEN, OF NEWBURG, NEW YORK.

Letters Patent No. 83,753, dated November 3, 1868.

IMPROVEMENT IN TREATING AND STORING GRAIN, &c.

The Schedule referred to in these Letters Patent and making part of the same

*To all whom it may concern:*

Be it known that I, CHARLES ALDEN, of Newburg, in the county of Orange, State of New York, have invented a new and useful Improvement in Treating and Storing Grain, Coffee, Rice, and other commodities; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
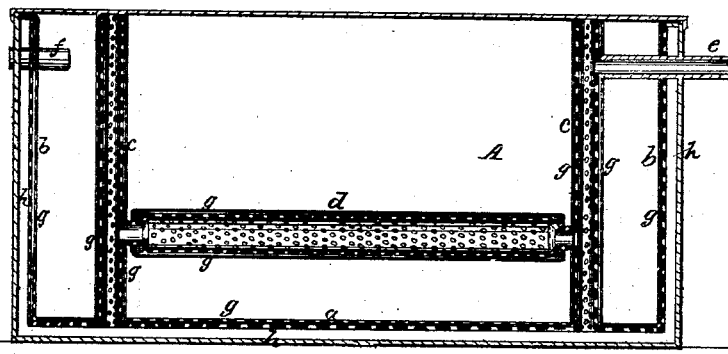
Figure 1 represents a transverse section of this invention.
Figure 2:
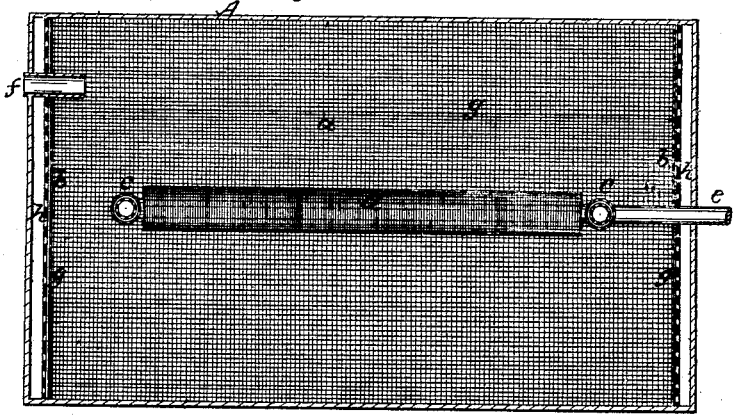
Figure 2 is a horizontal section thereof.

This invention relates to a bin, chamber, or compartment, (used or to be used for storing or drying grain, coffee, rice, and other commodities,) so constructed or arranged as to be hermetically sealed or made air-tight, and provided with perforated false bottoms and perforated false side walls, and severally so placed and arranged as to form air-chambers, said bottoms and side walls being covered with and protected by wire gauze or netting, and also provided with perforated columns, tubes, or cylinders, placed in a horizontal, vertical, or any other desirable position, and covered with and protected by wire-gauze or netting, said air-chambers, perforated false bottoms, side walls, columns, tubes, and cylinders to be used conjointly, or separately and severally, in combination and in connection with an air-tube or supply-pipe, and an air-exhaust tube or pipe, in such manner that a current or currents of hot or cold dry air can be made, either by suction or force, to pass through any quantity of grain, coffee, rice, or other commodities, in bulk or in bag or package, stored in the bin or compartment, by and through the perforated bottom, side walls, columns, tubes, or cylinders, jointly or severally, and in such manner as to permeate the entire body of the grain, coffee, rice, or other commodities, and absorb and carry off all heat or moisture, to dry and cool the same, and to keep the same in a perfectly cool and dry condition, and this without moving or handling for that purpose.

A represents a chamber or compartment, constructed of any suitable material, in such manner that it can be hermetically sealed or made air-tight, so as to prevent access or escape of air, except by and through the channels provided for those purposes at the option and will of the operator.

The chamber or compartment A is provided with a false perforated bottom, $a$, and false perforated side walls, $b$, covered with wire gauze or netting, $g$, constructed with proper braces and supports, a distance from the permanent floor and walls, so as to leave an air-chamber, $h$, connecting with the air-tubes, supply-pipes, exhaust-tubes, and the perforated columns, tubes, and cylinders.

From the false bottom $a$ rise two or more perforated columns or tubes, $c$, which are also covered with wire gauze or netting, and may be connected by one or more perforated horizontal cylinders or tubes $d$, covered with wire gauze or netting in like manner.

One of the columns, $c$, connects with a pipe, $e$, which extends through the side wall of the bin A, and connects with an air-pump or other devices for producing an impelled current of air, and another pipe, $f$, extends through the opposite side of the bin, as shown in the drawing, which may be operated with a shut-off valve, for the purpose of filling the compartment with compressed air, or may be operated as an exhaust for carrying off damp air.

If the bin is filled with grain or other commodities, and then hermetically closed, and air is forced in through the pipe $e$, this air passes down into the space or air-chamber below the false bottom, and it fills the space or air-chamber behind the false side walls, and issues through all the perforations in said false bottom and false side walls, and in the columns or tubes $c\ d$, so as to pass through the grain in the bin in every direction before it exhausts through the pipe $f$.

In its passage through the grain or other commodity, the dry air absorbs and takes up all the moisture, and prevents injury from heating or sweating.

If desired, a current of hot air may be injected, or dry, cold air may be used, according to the condition of the commodity to be acted upon.

It is obvious that the effect will be the same, if, instead of forcing the air in through the pipe $e$, it is sucked out through the pipe $f$.

I am aware of the patent granted to Sylvester Marsh, October 23, 1860.

Having thus described my invention,

What I claim as new, and desire to secure by Letters Patent, is—

The chamber A, adapted to be closed, and provided with false bottom $a$, side walls $b$, columns $c$, and supply and exhaust-pipes $e\ f$, when said bottom, side walls, and columns are perforated, and communicate with each other, whereby the contents of the chamber are not exposed to the ordinary action of the atmosphere, but adapted to be subjected to a forced current of hot or cold air, substantially as described.

CHARLES ALDEN.

Witnesses:
W. HAUFF,
E. F. KASTENHUBER.